United States Patent [19]

Reinke

[11] Patent Number: 4,535,507

[45] Date of Patent: Aug. 20, 1985

[54] METHOD AND APPARATUS FOR REMOVING LUMP MEAT FROM A CHESAPEAKE BAY BLUE CRAB

[75] Inventor: Theodore S. Reinke, Kennett Square, Pa.

[73] Assignee: Sea Savory, Inc., Cambridge, Md.

[21] Appl. No.: 541,092

[22] Filed: Oct. 12, 1983

[51] Int. Cl.³ ............................................. A22C 29/00
[52] U.S. Cl. ....................................................... 17/48
[58] Field of Search ................... 17/71, 66, 68, 69, 48, 17/46

[56] References Cited

U.S. PATENT DOCUMENTS

| | | | |
|---|---|---|---|
| 1,639,976 | 8/1927 | Barry | 17/56 |
| 2,502,091 | 3/1950 | Harris et al. | 17/71 |
| 3,696,465 | 10/1972 | Rossman | 17/48 |
| 4,019,224 | 4/1977 | Amaria et al. | 17/71 |

FOREIGN PATENT DOCUMENTS 133750 12/1929 Switzerland ............................. 17/68

Primary Examiner—Willie G. Abercrombie
Attorney, Agent, or Firm—Scrivener Clarke Scrivener & Johnson

[57] ABSTRACT

The backfin lump of meat is removed from the prepared body of a cooked Chesapeake Bay blue crab by cutting the body along planes which are, respectively, outside the collar bones which internally bound the lump meat cavities and converge to the center line of the back thereby providing an opening to each lump meat cavity, and then removing the lump meat through the opening using a special tool.

2 Claims, 6 Drawing Figures 4,535,507

METHOD AND APPARATUS FOR REMOVING LUMP MEAT FROM A CHESAPEAKE BAY BLUE CRAB

SUMMARY OF THE INVENTION

After cooking and removal of the carapace of Chesapeake Bay blue crab is prepared for removal of the lump meat in accordance with the invention by cutting the side mounds of the body along planes which are disposed at equal acute angles to the bottom shell of the crab and converge to meet along the intersection of the bottom shell and the middle bony ridge, and are outside the inner walls of the collar bones, thus exposing the two lump meats, after which a hand tool is inserted into each lump cavity on either side of the lump and is then compressed and withdrawn, bringing the lump with it.

BACKGROUND OF THE INVENTION

In the current art and industry of producing meat from the Chesapeake blue crab it is now common practice to prepare the cooked crab body for removal of the meat by processing the body through a machine which removes the claws, flippers, walking legs and carapace, and then brushes and flushes the visceral cavity. Further machine processing of the prepared body will successfully produce marketable "regular" meat, but not the backfin lump meat which is the most valuable product of the crab and which, to date, must be removed by hand picking. It has therefore been the object of this invention to provide improved means for easy removal of the lump meat from the cooked crab body, with the remainder of the meat to be extracted by machinery presently in use.

Figure 1:
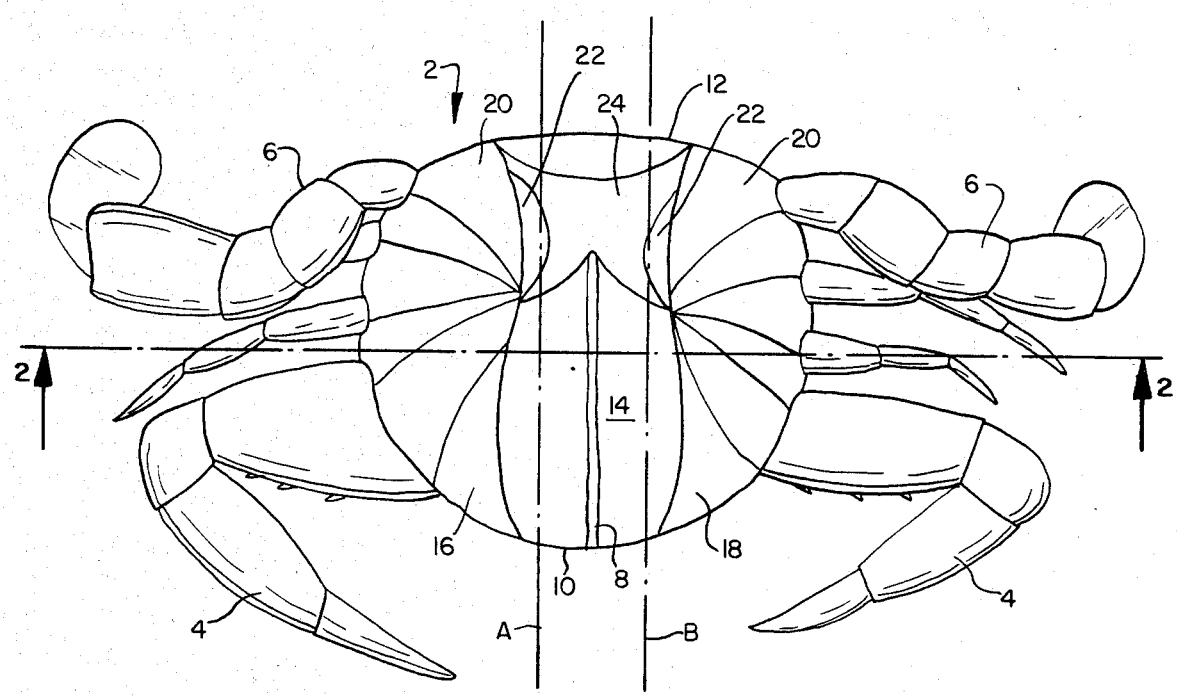
FIG. 1 is a plan view of a Chesapeake Bay blue crab, showing the walls of the lump meat cavity.

In FIG. 1 of the drawings there is illustrated in plan view a Chesapeake Bay blue crab, comprising the body 2, claws 4 and flippers and walking legs, including the back fins 6. In this figure the carapace has been removed to expose the central bony ridge 8 which extends along the back from the mouth 10 to the stern 12 within the visceral cavity 14. The body meat of the crab is within the two mounds 16, 18 on either side of the visceral cavity and the lump meats are formed within the mound cavities 20 which are adjacent the stern of the crab body and adjacent and communicating with the back fins 6. Each of these lump meat cavities is bounded internally of the crab body by a bony wall 22 which is concave on the side of the cavity, and the two walls 22 are connected by a bony plate 24 which bridges the visceral cavity.

It will be understood that before the practice of the invention the cooked crab body is prepared by removing the carapace, claws, walking legs, flippers and fins and cleaning the visceral cavity by brushing and flushing with water under high pressure.

DESCRIPTION OF THE PREFERRED EMBODIMENT OF THE INVENTION

Figure 2:
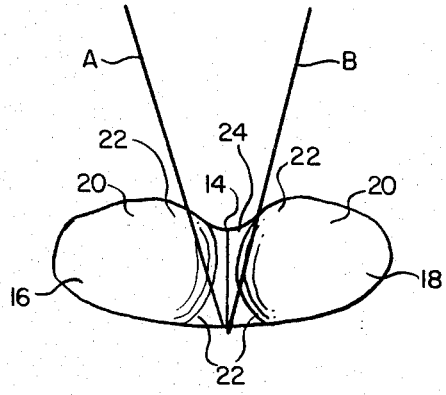
FIG. 2 is a partial sectional view taken on line 2—2 of FIG. 1 showing the planes along which cuts are made in accordance with the invention.

In the practice of the invention, and as particularly illustrated in FIGS. 1 and 2, the prepared crab body may be positioned on its bottom shell with the meat mounds facing upwardly, and the body then cut along two converging planes A,B which meet at the central bony back ridge 8 and each of which is outside but close to the bony wall 22 which bounds the lump meat cavity internally of the crab body, thus opening each of the lump meat cavities to the visceral cavity and exposing the lump meat within the cavity. The cuts are preferably so made that the bottom shell is severed along the line of the bony ridge 8, thus facilitating the removal of the meat by permitting it to be removed from the large opening resulting from removal of the collar bone wall which encloses each backfin lump cavity, and doing away with the necessity to cut the shell adjacent the backfin as has been required in conventional practice.

Figure 3:
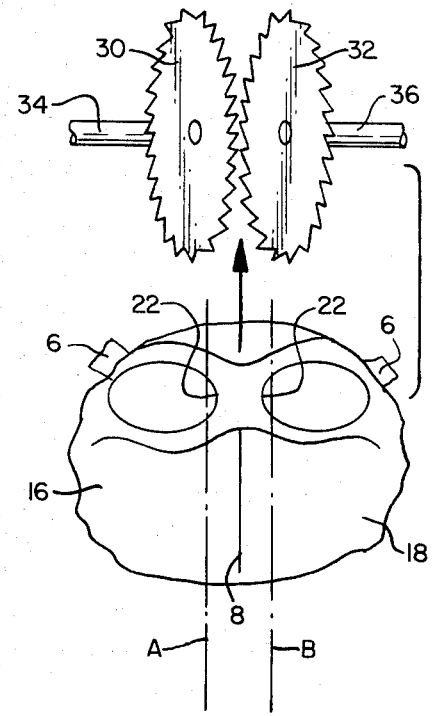
FIG. 3 is a partial plan view of the crab body of FIGS. 1 and 2 showing a preferred means for cutting the crab body.
Figure 4:
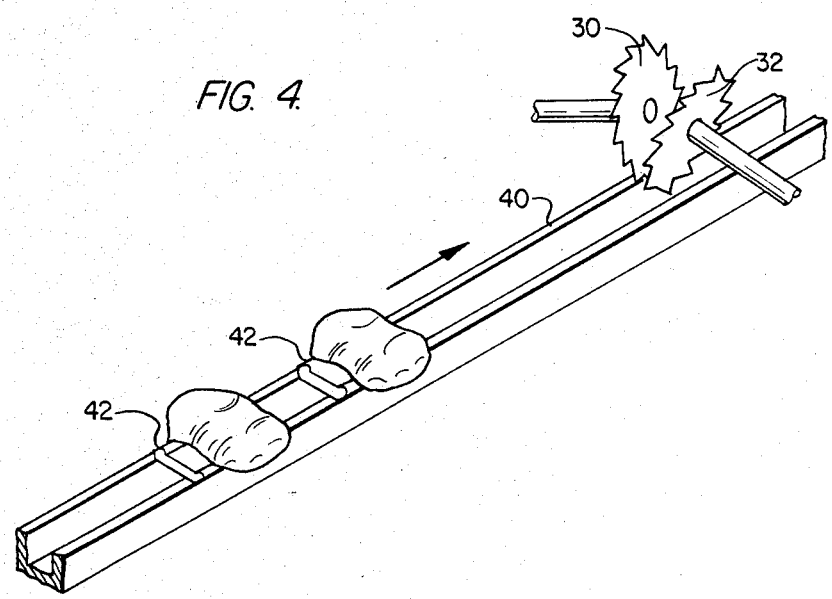
FIG. 4 is a perspective view of part of a machine for cutting the crab body.

In the preferred practice of the invention, and as particularly illustrated in FIGS. 3 and 4, the crab body is cut by two rotary saws or blades 30, 32 mounted on the ends of shafts 34, 36 which may be powered by any suitable means (not shown). These saws and their supporting shafts are so positioned that the planes of the saws converge toward the bottom of the crab body with their cutting edges meeting in the bottom of the body at the location of the bony ridge 8, thus preferably cutting the body into two pieces.

A preferred apparatus for carrying out the invention is disclosed in FIG. 4 and comprises a machine a part of which is a track 40 along which a plurality of crab body supporting carriages 42 are moved, by suitable conventional means, toward a fixed station at which there are positioned the two rotating power saws 30, 32. These described parts are so positioned and operated that the crab bodies are moved in succession along the track until each encounters the saws, which cut each of them in the manner and with the results which have been described.

Figure 5:
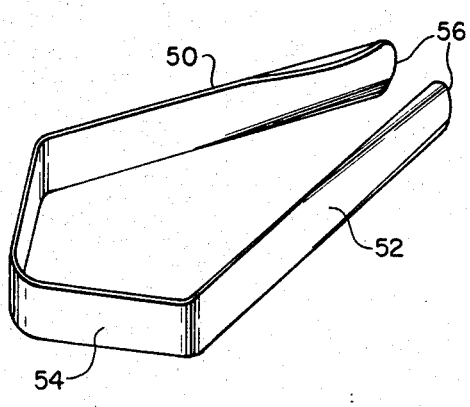
FIG. 5 is a perspective view of the hand tool provided by the invention for removing the lump meat.
Figure 6:
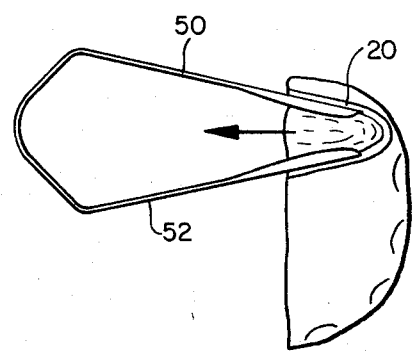
FIG. 6 is a plan view of one half of the crab body after cutting, and illustrating the hand tool in position to remove the lum meat.

Means are also provided by the invention for removing the lump meat from each of the cavities which has been prepared in the described manner, and such means comprise the tool disclosed in FIG. 5 and the manner of its use, which is illustrated in FIG. 6. The tool comprises a generally U-shaped strip of metal comprising arms 50, 52 connected by a cross piece 54, the material and construction of the tool being such that the arms are biased apart and may be resiliently moved toward and away from each other. The free ends of the arms are identically shaped, and each has a rounded outer end 56 and is also transversely curved with inward concavity for a distance along the arm from the rounded end greater than the depth of the lump meat cavity from the collar bone to the outer end of the cavity where it meets the backfin. The transverse curvature of each arm is substantially the same as that of the side walls of the lump meat cavity, which are the walls generally at right angles to the collar bone.

Cutting of the crab body in the described manner exposes the lump meat through the opening provided by removal of the collar bone. The free ends of the two arms of the tool are now inserted into the lump meat cavity 20 with the outside surface of each arm in engagement with the inner surface of one of the side walls of the cavity. The arms are advanced in this manner as to the outer end of the cavity and then compressed toward each other sufficiently to firmly grasp the lump without compressing its meat, and the tool is then withdrawn bringing the lump meat with it in its undamaged, valuable condition. While the use of the described tool is preferred, the lump meat may be removed by other means such, for example, as a spoon.

Removal of the lump meat in the manner and with the means provided by this invention eliminates the need to manually or mechanically cut off the backfin "knuckle" precisely at the body of lump meat and pulling the lump away from the fine tendens which extend from the "knuckle" into the lump meat section, which must be done without tearing apart the lump in order to preserve its value.

We claim:

1. In the processing of a cooked Chesapeake Bay blue crab having two lumps of crab meat each of which is within a cavity which is connected to a back fin by a knuckle and is bounded internally of the crab body by a bony wall extending from the back of the crab body to the carapace, the method of removing the lumps of crab meat comprising the steps of:
   (a) removing the carapace, cleaning the visceral cavity, and supporting the back of the crab body,
   (b) cutting the crab body from mouth end to stern end along two planes each of which passes closely outside the bony wall bounding one of the lump meat cavities and which converge to meet at the center of the back of the crab body,
   (c) removing the part of the crab body between the saw cuts, including the bony walls bounding the lump cavities, and
   (d) removing the lump meat from each cavity through the opening formed by removal of the bony wall which bounded the cavity internally of the crab body.

2. In the processing of a cooked Chesapeake Bay blue crab having two lumps of crab meat each of which is within a cavity which is connected to a back fin by a knuckle and is bounded internally of the crab body by a bony wall extending from the back of the crab body to the carapace, the method of removing the lumps of crab meat comprising the steps of:
   (a) cutting entirely through the crab body along a plane which is generally parallel to the bony wall which bounds the inside of the lump meat cavity and is close to and outside the bony wall, and
   (b) removing the lump meat from each cavity through the opening formed by removal of the bony wall which bounded the cavity internally of the crab body.

* * * * *